United States Patent
Armbrust et al.

(10) Patent No.: US 6,713,559 B1
(45) Date of Patent: Mar. 30, 2004

(54) SOL-GEL COATING

(75) Inventors: Manuela Armbrust, Münster (DE); Horst Hintze-Brüning, Münster (DE); Wilfried Stübbe, Greven (DE); Peter Betz, Münster (DE); Christel Ehlig, Münster (DE)

(73) Assignee: BASF Coatings AG, Munster (DE)

( * ) Notice: Subject to any disclaimer, the term of this patent is extended or adjusted under 35 U.S.C. 154(b) by 59 days.

(21) Appl. No.: 10/069,188

(22) PCT Filed: Aug. 17, 2000

(86) PCT No.: PCT/EP00/08032

§ 371 (c)(1),
(2), (4) Date: Feb. 21, 2002

(87) PCT Pub. No.: WO01/16242

PCT Pub. Date: Mar. 8, 2001

(30) Foreign Application Priority Data

Aug. 27, 1999 (DE) .......................... 199 40 857

(51) Int. Cl.$^7$ .............................. C08L 83/06
(52) U.S. Cl. ................. 525/100; 106/287.14; 428/447; 427/387
(58) Field of Search .................... 525/100; 106/287.14; 428/447; 427/387

(56) References Cited

U.S. PATENT DOCUMENTS

| | | | |
|---|---|---|---|
| 3,639,147 A | 2/1972 | Benefiel et al. ............... 117/73 |
| 3,953,644 A | 4/1976 | Camelon et al. ............. 428/220 |
| 4,220,679 A | 9/1980 | Backhouse .................. 427/401 |
| 4,246,382 A | 1/1981 | Honda et al. .................. 526/79 |
| 4,268,542 A | 5/1981 | Sakakibara et al. ......... 427/195 |
| 4,489,135 A | 12/1984 | Drexler et al. ........... 428/423.1 |
| 4,576,868 A | 3/1986 | Poth et al. ............... 428/423.1 |
| 4,675,234 A | 6/1987 | Sachs et al. ................ 428/328 |
| 4,719,132 A | 1/1988 | Porter, Jr. .................. 427/409 |
| 4,730,020 A | 3/1988 | Wilfinger et al. ........... 524/555 |
| 4,746,366 A | 5/1988 | Philipp et al. ......... 106/287.19 |
| 4,754,014 A | 6/1988 | Ryntz et al. .................. 528/28 |
| 4,851,460 A | 7/1989 | Stranghöner et al. ....... 523/407 |
| 4,880,867 A | 11/1989 | Gobel et al. ................ 524/507 |
| 4,895,910 A | 1/1990 | Isozaki et al. ........... 525/326.5 |
| 4,914,148 A | 4/1990 | Hille et al. ................ 524/507 |
| 4,945,128 A | 7/1990 | Hille et al. ................ 524/591 |
| 4,981,759 A | 1/1991 | Nakatani et al. ............ 428/626 |
| 5,075,372 A | 12/1991 | Hille et al. ................ 524/839 |
| 5,079,312 A | 1/1992 | Isozaki et al. ............. 525/479 |
| 5,221,329 A * | 6/1993 | Tarr ............................ 106/2 |
| 5,334,420 A | 8/1994 | Hartung et al. .......... 427/407.1 |
| 5,342,882 A | 8/1994 | Göbel et al. ................ 524/832 |
| 5,356,669 A | 10/1994 | Rehfuss et al. .......... 427/407.1 |
| 5,368,944 A | 11/1994 | Hartung et al. .......... 428/423.1 |
| 5,370,910 A | 12/1994 | Hille et al. .............. 427/407.1 |
| 5,412,016 A * | 5/1995 | Sharp ........................ 524/430 |
| 5,418,264 A | 5/1995 | Obloh et al. ................ 523/414 |
| 5,425,970 A | 6/1995 | Lahrmann et al. .......... 427/493 |
| 5,447,998 A | 9/1995 | Grandy et al. | |
| 5,474,811 A | 12/1995 | Rehfuss et al. .......... 427/407.1 |
| 5,516,559 A | 5/1996 | Röckrath et al. ......... 427/407.1 |
| 5,569,705 A | 10/1996 | Vogt-Birnbrich et al. ... 524/591 |
| 5,571,861 A | 11/1996 | Klein et al. ................. 524/591 |
| 5,576,386 A | 11/1996 | Kempter et al. .............. 526/88 |
| 5,601,878 A | 2/1997 | Kranig et al. ............... 427/386 |
| 5,601,880 A | 2/1997 | Schwarte et al. ........ 427/407.1 |
| 5,605,965 A | 2/1997 | Rehfuss et al. ............. 525/100 |
| 5,654,391 A | 8/1997 | Göbel et al. .................. 528/71 |
| 5,670,257 A * | 9/1997 | Sakai et al. ................. 428/402 |
| 5,691,425 A | 11/1997 | Klein et al. ................. 525/455 |
| 5,726,258 A | 3/1998 | Fischer et al. ................ 526/64 |
| 5,760,128 A | 6/1998 | Baltus et al. ............... 524/591 |
| 5,965,213 A | 10/1999 | Sacharski et al. .......... 427/475 |
| 5,989,687 A * | 11/1999 | Li .............................. 428/195 |
| 6,309,707 B1 | 10/2001 | Mayer et al. ............... 427/386 |

FOREIGN PATENT DOCUMENTS

| | | | |
|---|---|---|---|
| CA | 2033530 | 7/1991 | ......... C09D/175/04 |
| CA | 2104845 | 8/1993 | ......... C09D/161/00 |
| CA | 2102169 | 5/1994 | ......... C09D/175/14 |
| CA | 2073115 | 8/2001 | ......... C09D/175/14 |
| CA | 2078650 | 8/2001 | ......... C09D/133/00 |
| CA | 2102170 | 8/2001 | ......... C09D/133/00 |
| CA | 2127761 | 8/2001 | ......... C09D/175/04 |
| EP | 038 127 A1 | 3/1981 | ............ B05D/7/26 |
| EP | 249 201 A2 | 6/1987 | ............ C09D/3/58 |

(List continued on next page.)

OTHER PUBLICATIONS

English Abstract for DE 38 28 098 A1.
English Abstract for DE 40 11 045 A1.
English Abstract for DE 40 20 316 A1.
English Abstract for DE 40 25 215 A1.

(List continued on next page.)

Primary Examiner—Margaret G. Moore

(57) ABSTRACT

The invention relates to a sol-gel coating material, containing (A) an acrylate copolymer solution, consisting of at least one acrylate copolymer (A1), (B) a sol which can be produced by the hydrolysis, condensation and complexing of at least one hydrolysable metal compound (B1) of the dormula (1): $MR_n$; wherein the variable and the index have the following meanings: M=aluminium, titanium or zirconium; R=hydrolysable group, hydroxy groups and non-hydrolysable groups, with the proviso that there should be at least one, preferable two hydrolysable groups; and n=3 or 4; by the hydrolysis, condensation and complexing of at least one hydrolysable silane (B2) of the formula (II): $Si(R^1)_2(R^2)_2$; wherein the varible $R^1$ and $R^2$ have the following meanings: $R^1$=alkyl and/or cycloalkyl radicals and $R^2$=alkoxy and/or cycloakoxy radicals; and by the hydrolysis, condensation and complexing of at least one hydrollysable silane (B3) of the formula (III): $SiR_4$; wherein the variable R has the aforementioned given meaning: with the proviso that the silane (B3) is not a silane (B2) according to the general formula (II); and (C) between 0 and 40% by weight in relation to the total quantity of the coating material, of a parent lacquer which can be produced by the hydrolysis and condensation of least one hydrolysable silane (B3) of general formula (III).

23 Claims, No Drawings

FOREIGN PATENT DOCUMENTS

| | | | | |
|---|---|---|---|---|
| EP | 276 501 | A2 | 9/1987 | C11D/1/42 |
| EP | 299 148 | A2 | 4/1988 | C08G/18/08 |
| EP | 354 261 | A1 | 8/1988 | C08G/18/50 |
| EP | 394 737 | A1 | 4/1990 | C09D/175/06 |
| EP | 401 565 | A1 | 5/1990 | C09D/5/02 |
| EP | 424 705 | A2 | 10/1990 | C08F/283/00 |
| EP | 543 817 | B1 | 2/1991 | C08G/18/08 |
| EP | 531 510 | B1 | 3/1992 | C08L/75/04 |
| EP | 522 420 | A2 | 6/1992 | C08J/3/03 |
| EP | 590 484 | A1 | 9/1993 | C08G/18/08 |
| EP | 594 068 | A1 | 10/1993 | C09D/201/02 |
| EP | 594 071 | A1 | 10/1993 | C09D/201/02 |
| EP | 594 142 | A1 | 10/1993 | C08L/57/12 |
| GB | 2012191 | A | 12/1978 | |
| WO | WO82/02387 | | 7/1982 | C08F/2/02 |
| WO | WO92/22615 | | 12/1992 | C09D/151/08 |
| WO | WO94/10211 | | 5/1994 | C08F/8/30 |
| WO | WO94/10212 | | 5/1994 | C08F/8/30 |
| WO | WO94/10213 | | 5/1994 | C08F/8/30 |
| WO | WO94/22968 | | 10/1994 | C09D/133/06 |
| WO | WO95/14721 | | 1/1995 | C08F/290/14 |
| WO | WO96/12747 | | 2/1996 | C08F/285/00 |
| WO | WO97/12945 | | 4/1997 | C09D/5/04 |
| WO | WO97/49745 | | 12/1997 | C08G/18/08 |
| WO | WO97/49747 | | 12/1997 | C08G/18/75 |
| WO | WO00/53687 | | 9/2000 | C09D/133/00 |

OTHER PUBLICATIONS

English Abstract for DE 41 22 743 C1.
English Abstract for DE 43 03 570 A1.
English Abstract for EP 0297 576 b1.
English Abstract for WO 94/22968 On Front Page Of The International Publication.
Chemical Abstracts, vol. 84, No. 18, May 3, 1976,Columbus, Ohio, US; abstract No. 123526w, p. 94;XP002153878; & JP 50 095388 A (TOA GOSEI CHEM IND CO, LDT) Jul. 29, 1975.
English Abstract for DE43 28 092 A1.
English Abstract for EP0 604 992 A1.
English Abstract for DE 197 09 465 A1.
English Abstract for EP 540 884 A1.
English Abstract for DE 28 48 906 A1.
English Abstract for 19613547.
English Language Abstract EP 436 941.
English Language Abstract EP 260 447.
English Language Abstract EP 297 576.
BASF Lacke & Farben, PCT/EP94/01956, filed Jun. 16, 1993, Entitled "Process for the preparation of polyurethane resins and their us e and the use ethoxyethyl propionate for the preparation of polyurethane resins", p. 1–38.
English Language Abstract Cover Page Of The International Publication WO96/12747.
English Language Abstract DE 43 28 092 A1.
English Language Abstract Cover Page Of The International Publication WO95/14721.
English Language Abstract Cover Page Of The International Publication WO00/53687.
English Abstract for EP 0 069 936 A2.
English Abstract for DE 39 03 804 C2.

* cited by examiner

SOL-GEL COATING

This application is a National Phase Application of Patent Application PCT/EP00/08032 filed on Aug. 17, 2000.

The present invention relates to a novel sol-gel coating material for producing sol-gel coatings atop single-coat or multicoat paint systems. The present invention relates in particular to a novel process for producing coated substrates, especially coated automobile bodies, by initially providing the a substrates with a multicoat paint system and then applying a sol-gel coating material thereatop and curing it.

Automobile bodies are for the most part provided with a multicoat coating system. As the final coat, it is common to apply clearcoat materials. Useful clearcoat materials include the customary and known one component (1K), two component (2K), multicomponent (3K, 4K) powder or powder slurry clearcoat materials or UV curable clearcoat materials.

One component (1K), two component (2K) or multicomponent (3K, 4K) clearcoat materials are described for example in the patent documents U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

Powder clearcoat materials are known for example from German patent document DE-A-42 22 194 or BASF Lacke+ Farben AG's 1990 Pulverlacke product bulletin.

Powder slurries are powder coating materials in the form of aqueous dispersions. Slurries of this kind are described for example in the U.S. Pat. No. 4,268,542 and the German patent applications DE-A-195 18 392.4 and DE-A-196 13 5417 and the German patent application DE-A-198 14 471.7, which was unpublished at the priority date of the present invention.

UV curable clearcoat materials are disclosed for example in the patent documents EP-A-0 540 884, EP-A-0 568 967 or U.S. Pat. No. 4,675,234.

Each of these clearcoat materials has its specific strengths and weaknesses. They do provide multicoat paint systems meeting the optical requirements. However, the mar-resistant one component (1K) clearcoat materials are occasionally not sufficiently weathering resistant, whereas the weathering resistant two component (2K) or multicomponent (3K, 4K) clearcoat materials are frequently insufficiently mar resistant. Some one component (1K) clearcoat materials are mar resistant and stable to weathering, but combined with frequently employed waterborne basecoat materials give rise to surface defects such as wrinkling.

Powder clearcoat materials, powder slurry clearcoat materials and UV curable clearcoat materials, by contrast, possess an unsatisfactory intercoat adhesion without fully solving the mar resistance or etch resistance problems.

Recently, materials known as sol-gel clearcoats and based on siloxane-containing coating formulations have been developed which are obtained by hydrolysis and condensation of silane compounds. These coating materials, which are used as coating compositions on plastics, are described for example in the German DE-A patent documents 43 03 570, 34 07 087, 40 11 045, 40 25 215, 38 28 098, 40 20 316 or 41 22 743.

Sol-gel clearcoats impart very good mar resistance to substrates made of plastic, such as spectacle lenses or motorcycle helmet visors, for example. This mar resistance is not achieved by the known OEM (original equipment manufacturing) clearcoat materials normally used for the original finishing of vehicles. The automotive industry is now demanding that this improved mar resistance be transferred to the clearcoats, used in the finishing of automobiles as well.

Replacing the OEM clearcoat materials or OEM powder slurry clearcoat materials commonly used in automotive finishing by sol-gel clearcoat materials is not a straightforward matter, however, since the sol-gel clearcoats are too brittle for this purpose, for example, or since the attempt to conform them to the OEM requirements frequently provides only poor optical properties (appearance). Above all, the ;sol-gel clearcoat materials are too expensive. The economically more favorable use of the sol-gel clearcoat materials as an additional coat over the clearcoats or powder slurry clearcoats used to date gives rise to adhesion problems between the clearcoat and the sol-gel coat, these problems arising in particular after stone chipping and on exposure to condensation.

These problems can be solved by only partially curing the clearcoat which is to be coated with the sol-gel clearcoat material, so that the sol-gel coat can be chemically anchored, as it were, on the clearcoat in the course of the conjoint curing. However, this approach entails the requirement that, on one and the same coating line, the clearcoats on automobile bodies which are to be overcoated have to be cured at a different temperature than the clearcoats of the other automobile bodies which are not to be overcoated. The use of different curing conditions on one coating line constitutes a substantial disadvantage. This disadvantage is additionally aggravated by the fact that the second layer of clearcoat material requires a long oven drying time to cure.

It is an object of the present invention to provide a novel sol-gel coating material whereby the advantageous properties of the sol-gel coatings are combinable with the advantageous properties of the known single-coat or multicoat paint systems, especially the multicoat paint systems for automotive OEM coating, without any need for departures from the customarily employed coating techniques, especially the wet on wet technique of automotive OEM coating. In other words, the novel sol-gel coating material shall in particular permit the subsequent application, within a short time, of a mar resistant coating atop ready produced, previously cured paint systems without any adhesion problems arising in the process.

This object is achieved by the novel sol-gel coating material comprising (A) an acrylate copolymer solution comprising at least one acrylate copolymer (A1) preparable by copolymerizing at least the following monomers:
  a1) at least one (meth)acrylic ester which is substantially free of acid groups,
  a2) at least one ethylenically unsaturated monomer which bears at least one hydroxyl group per molecule and is substantially free of acid groups, and
  a3) at least one ethylenically unsaturated monomer which bears per molecule at least one acid group which is convertible into the corresponding acid anion group;

(B) a sol preparable by hydrolyzing, condensing and complexing
  B1) at least one hydrolyzable metal compound of the general formula I $$MR_n \qquad (I)$$

where the variables and the index have the following meaning:
M=aluminum, titanium or zirconium,
R=hydrolyzable groups, hydroxyl groups and non-hydrolyzable groups with the proviso that there is at least one and there are preferably at least two hydrolyzable group(s), and n=3 or 4;

B2) at least one hydrolyzable silane of the general formula II $$Si(R^1)_2(R^2)_2 \quad (II)$$

in which the variables $R^1$ and $R^2$ have the following meaning:

$R^1$=alkyl and/or cycloalkyl radicals and $R^2$=alkoxy and/or cycloalkoxy radicals; and B3) at least one hydrolyzable silane of the general formula III $$SiR_4 \quad (III),$$

where the variable R has the meaning given above; with the proviso that the silane (B3) is not a silane (B2) according to the general formula II, and (C) 0 to 40% by weight, based on the total amount of coating material, of a stock coating material, preparable by hydrolyzing and condensing at least one hydrolyzable silane (B3) of the general formula III.

In what follows, the novel sol-gel coating material will be referred to as the subject coating material.

The present invention also provides the novel process for producing sol-gel coatings on single-coat or multicoat paint systems by (i) applying a single-coat or multicoat paint system to a primed or unprimed substrate, (ii) applying a sol-gel coating material atop the single-coat or multicoat paint system, and, (iii) curing the sol-gel coating material, characterized in that a subject coating material is used.

In what follows, the novel process for producing sol-gel coatings atop single-coat or multicoat paint systems will be referred to as the subject process, for brevity's sake.

The invention further provides novel sol-gel coatings which are preparable from the subject coating materials and will hereinafter be referred to as the subject sol-gel coatings.

Not least, the invention provides novel substrates which comprise at least one subject sol-gel coating and will hereinafter be referred to as the subject substrates.

In the light of the background art, it is surprising and unforeseeable for one skilled in the art that the object underlying the invention is accomplishable using the subject coating material and the subject process. It is especially surprising that the subject, coating material should readily adhere to the ready produced, cured paint systems without detachments or cracks occurring on stone chipping or following exposure to condensation, i.e., ten days' exposure of the coats in an atmosphere of 40° C. and 100% relative humidity. Moreover, the optical properties of the paint systems provided with the subject sol-gel coatings satisfy all requirements.

The subject coating material is a siloxane-containing coating formulation which can be prepared by reacting hydrolyzable silicon compounds with water or water-detaching agents and which contains organic constituents to improve certain properties. A general description of such systems may be found for example in the article by Bruce M. Novak, "Hybrid Nanocomposite Materials—Between Inorganic Glasses and Organic Polymers", in Advanced Materials, 1993, 5, No. 6, pages 422–433, or in the contribution of R. Kasemann, H. Schmidt to the 15th International Conference, International Centre for Coatings Technology, Paper 7, "Coatings for mechanical and chemical protection based on organic-inorganic Sol-Gel Nanocomposites", 1993.

The basic reactions take place in a sol-gel process in which tetraorthosilicates are hydrolyzed and condensed in the presence or absence of a cosolvent:

Hydrolysis:

$Si(OR)_4 + H_2O \rightarrow (RO)_3Si\text{—}OH + ROH$

Condensation:

—Si—OH+HO—Si—→—Si—O—Si—+$H_2O$

—Si—OH+RO—Si—→—Si—O—Si—+ROH in which R may be an alkyl group, such as methyl or ethyl. Tetramethyl orthosilicate (TMOS) or tetraethyl orthosilicate (TEOS) are frequently used. The reactions are catalyzed using acids, bases or fluoride ions.

The subject coating material accordingly comprises siloxane-containing structures modified by organic constituents (Ormocer®=Organically Modified Ceramic).

The subject sol-gel coating is produced by controlled hydrolysis and condensation, and completing, of silicate esters and of metal compounds. Specific properties are conferred on the subject sol-gel coating through the incorporation into the silicatic network of organically modified silica derivatives. They allow the construction of an organic polymer network in addition to the basic inorganic scaffold when organic radicals are used which preferably contain olefinically unsaturated groups and/or epoxide groups.

The modifying can be effected for example by having a ready produced organic polymer present during the hydrolysis and condensation of the starting materials or in the sol.

The subject coating material comprises or consists of the two essential constituents (A) and (B). It preferably comprises the two essential constituents (A) and (B) and at least one suitable additional constituent.

Component (A) is an acrylate copolymer solution. It is preferably free of aromatic solvents. For the purposes of the present invention, the expression "free of aromatic solvents" or "aromatics free" is to be understood here and hereinbelow as meaning that the level of aromatic solvents or aromatic compounds in a solution is preferably <5% by weight, more preferably <1% by weight, with particular preference <0.5% by weight, and with very particular preference <0.2% by weight, and is especially below the limit of detection by gas chromatography.

The acrylate copolymer solution (A) to be used according to the invention contains at least one acrylate copolymer (A1) which is prepared by the copolymerization of the hereinbelow specified monomers (a1), (a2) and (a3) and optionally further monomers (a4), (a5) and/or (a6), where (a1), (a2) and (a3) and also optionally (a4), (a5) and (a6) are chosen in terms of type and amount in such a way that the acrylate copolymer (A1) has the desired OH number, acid number and molecular weight. The acrylate copolymers (A1) preferably have a hydroxyl number of 40 to 240, particularly preferably 60 to 210 and especially 100 to 200, an acid number of 5 to 100, particularly preferably 10 to 60 and especially 20 to 40, glass transition temperatures of −35 to +85° C. and number average molecular weights Mn of 1 000 to 300 000.

The polyacrylate resins used inventively may be prepared using as monomer (a1) any (meth)acrylic acid alkyl or cycloalkyl ester which is copolymerizable with (a2), (a3), (a4), (a5) and (a6) and has up to 20 carbon atoms in the alkyl radical, especially methyl, ethyl, propyl, n-butyl, sec-butyl, tert-butyl, hexyl, ethylhexyl, stearyl and lauryl acrylate or meth-acrylate; cycloaliphatic (meth)acrylates, especially cyclohexyl, isobornyl, dicyclopentadienyl, octahydro-4,7-methano-1H-indenemethanol or tert-butylcyclohexyl (meth) acrylate; (meth)acrylic oxaalkyl or oxacycloalkyl esters such as ethyltriglycol (meth)acrylate and methoxyoligoglycol (meth)acrylate having a molecular weight Mn of preferably 550; or other ethoxylated and/or propoxylated, hydroxyl-free (meth)acrylic acid derivatives. These monomers may include, in minor amounts, higher polyfunctional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth)acrylate; or pentaerythritol di-, tri- or tetra(meth)acrylate. In the context of the present invention, minor amounts of higher polyfunctional monomers (a1) are those amounts that do not lead to crosslinking or gelling of the polyacrylate resins.

As the monomer (a2) it is possible to use any ethylenically unsaturated monomers which are copolymerizable with (a1), (a2), (a3), (a4), (a5) and (a6) and different from (a5) which carry at least one hydroxyl group per molecule and are substantially free of acid groups, such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide; especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl esters; or olefinically unsaturated alcohols such as allyl alcohol or polyols such as trimethylolpropane monoallyl or diallyl, ether or pentaerythritol monoallyl, diallyl or triallyl ether. As far as these higher polyfunctional monomers (a2) are concerned, the comments made for the higher polyfunctional monomers (a1) apply analogously. The proportion of trimethylolpropane monoallyl ether is usually from 2 to 10% by weight, based on the overall weight of the monomers (a1) to (a6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers (a2), but in particular may be used proportionally in combination with other of the abovementioned hydroxyl-containing monomers (a2).

As monomer (a3) it is possible to use any ethylenically unsaturated monomer, or mixture of such monomers, which carries at least one acid group, preferably one carboxyl group, per molecule and is copolymerizable with (a1), (a2), (a4), (a5) and (a6). As component (a3) it is particularly preferred to use acrylic acid and/or methacrylic acid. However, other ethylenically unsaturated carboxylic acids having up to 6 carbon atoms in the molecule may also be used. Examples of such acids are ethacrylic acid, crotonic acid, maleic acid, fumaric acid, and itaconic acid. It is further possible to use ethylenically unsaturated sulfonic or phosphonic acids, and/or their partial esters, as component (a3). Further suitable components (a3) include mono(meth)acryloyloxyethyl maleate, succinate and phthalate.

As monomers (a4) it is possible to use one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids which have 9 to 11 carbon atoms and are branched at the alpha carbon atom.

As the monomer (a5), use is made of the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the trade name "Cardura". The reaction of the acrylic or methacrylic acid with the glycidyl ester of a Larboxylic acid having a tertiary alpha carbon atom can take place before, during or after the polymerization reaction. As the component (a5) it is preferred to use the reaction product of acrylic acid and/or methacrylic, acid with the glycidyl ester of Versatic acid. This glycidyl ester is commercially available under the name "Cardura E10".

As monomers (a6) it is possible to use all ethylenically unsaturated monomers, or mixtures of such monomers, which are copolymerizable with (a1), (a2), (a3), (a4) and (a5), are different from (a1), (a2), (a3) and (a4), and are substantially free of acid groups. Suitable components (a6) include the following:

olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)aciylamide, N-methyl-, N,N-dimethyl-, N-ethyl-, N,N-diethyl-, N-propyl-, N,N-dipropyl-, N-butyl-, N,N-dibutyl-, N-cyclohexyl- and/or N,N-cyclohexyl-methyl-(meth)-acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitriles such as acrylonitrile and/or methacrylo-nitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl, ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers having a number average molecular weight Mn of from 1 000 to 40 000, preferably from 2 000 to 20 000, with particular preference from 2 500 to 10 000 and in particular from 3 000 to 7 000 and having on average from 0.5 to 2.5, preferably from 0.5 to 1.5, ethylenically unsaturated double bonds per molecule, as described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A 44 21 823 or in the international patent application WO 92/22615 on page 12, line 18 to page 18, line 10, or acryloxysilane-containing vinyl monomers, preparable by reacting hydroxy-functional silanes with epichlorohydrin and subsequently reacting the reaction product with methacrylic acid, and/or hydroxyalkyl esters of (meth)acrylic acid.

Preference is given to using vinylaromatic hydrocarbons, especially styrene.

The nature and amount of the components (a1) to (a6) is selected such that the polyacrylate resin (A1) has the desired OH number, acid number, and glass transition temperature. Acrylate resins used with particular preference are obtained by polymerizing (a1) from 20 to 60% by weight, preferably from 30 to 50% by weight, of the component (a1), (a2) from 10 to 50% by weight, preferably from 15 to 40% by weight, of the component (a2), (a3) from 1 to 15% by weight, preferably from 1 to 8% by weight, of the component (a3), (a4) from 0 to 25% by weight of the component (a4), (a5) from 0 to 25% by weight of the component (a5), and (a6) from 5 to 30% by weight, preferably from 10 to 20% by weight, of the component (a6), the sum of the weight fractions of the components (a1) to (a6) being 100% in each case.

The inventively employed acrylate copolymers (A1) are prepared in an organic solvent or solvent mixture, which is preferably free of aromatic solvents, and in the presence of at least one polymerization initiator. Polymerization initiators used are the polymerization initiators which are customary for the preparation of acrylate copolymers.

Examples of suitable polymerization initiators are initiators which form free radicals, such as, for example, tert-butyl peroxyethylhexanoate, benzoyl peroxide, di-tert-amyl peroxide, azobisisobutyro-nitrile, and tert-butyl perbenzoate. The initiators are used preferably in an amount of from 1 to 25% by weight, with particular preference from 2 to 10% by weight, based on the overall weight of the monomers.

The polymerization is advantageously conducted at a temperature of from 80 to 200° C., preferably from 110 to 180° C.

Preferred solvents used are ethoxyethyl propionate and isopropoxypropanol.

The acrylate copolymer (A1) is preferably prepared by a two-stage process since the resulting subject coating materials have a better processability as a result. Preferred acrylate copolymers (A1) used are therefore obtainable by 1. polymerizing a mixture of the monomers (a1) and (a2) and, if desired, (a4), (a5) and/or (a6), or a mixture of portions of the monomers (a1) and (a2) and also, if desired, (a4), (a5) and/or (a6), in an organic solvent, and 2. after at least 60% by weight of the mixture of (a1) and (a2) and, if desired, (a4), (a5) and/or (a6) have been added, adding the monomer (a3) and any remainder of the monomers (a1) and (a2) and, if appropriate, (a4), (a5) and/or (a6), and continuing polymerization.

In addition, however, it is also possible to include the monomers (a4) and/or (a5) in the initial, charge, together with at least some of the solvent, and to meter in the remaining monomers. Furthermore, it is also possible for only some of the monomers (a4) and/or (a5) to be included in the initial charge, together with at least some of the solvent, and for the remainder of these monomers to be added as described above. Preferably, for example, at least 20% by weight of the solvent and about 10% by weight of the monomers (a4) and (a5), and, if desired, portions of the monomers (a1) and (a6), are included in the initial charge.

Preference is further given to a two-stage process for the preparation of the inventively used acrylate polymers (A1) in which the first stage lasts for from 1 to 8 hours, preferably from 1.5 to 4 hours, and the mixture of (a3) and any remainder of the monomers (a1) and (a2) and, if appropriate, (a4), (a5) and (a6) is added over the course of from 20 to 120 minutes, preferably over the course of from 30 to 90 minutes. Following the end of the addition of the mixture of (a3) and any remainder of the monomers (a1) and (a2) and, if appropriate, (a4), (a5) and (a6), polymerization is continued until all of the monomers used have undergone substantially complete reaction. In this case, the second stage may follow on immediately from the first. Alternatively, the second stage may be commenced only after a certain time; for example, after from 10 minutes to 10 hours.

The amount, and rate of addition, of the initiator is preferably chosen so as to give an acrylate copolymer (A1) having a number-average molecular weight Mn of from 1 000 to 30 000 daltons. It is preferred to commence the addition of initiator some time, generally from about 1 to 15 minutes, before the addition of the monomers. Furthermore, preference is given to a process in which the addition of initiator is commenced at the same point in time as the addition of the monomers and ended about half an hour after the addition of the monomers has ended. The initiator is preferably added in a constant amount per unit time. Following the end of the addition of initiator, the reaction mixture is held at polymerization temperature (generally 1.5 hours) until all of the monomers used have undergone substantially complete reaction. "Substantially complete reaction" is intended to denote that preferably 100% by weight of the monomers used have been reacted but that it is also possible for a small residual monomer content of not more than up to about 0.5% by weight, based on the weight of the reaction mixture, to remain unreacted.

Preferably, the monomers for preparing the acrylate copolymers (A1) are polymerized with not too high a polymerization solids, preferably with a polymerization solids of from 80 to 50% by weight, based on the monomers, and then the solvents are partially removed by distillation, so that the resulting acrylate copolymer solutions (A) have a solids content of preferably from 100 to 60% by weight.

For use in the subject coating material, the solids content of the acrylate copolymer solutions. (A) is adjusted with at least one aromatics-free solvent to 5 to 60, preferably 5 to 40% by weight, and in particular 10 to 30% by weight, in each case based on the solution (A).

Examples of suitable solvents are ethoxyethyl propionate and butyl glycol.

The preparation of the acrylate copolymers (A1) for inventive, use has no special features in terms of method but instead takes place with the aid of the methods which are customary and known in the polymers field of continuous or batchwise copolymerization under atmospheric or superatmospheric pressure in stirred tanks, autoclaves, tube reactors or Taylor reactors.

Examples of suitable copolymerization processes are described in the patents DE-A-197 09 465, DE-C-197 09 476, DE-A-28 48 906, DE-A-195 24 182, EP-A-0 554 783, WO 95/27742 or WO 82/02387.

Examples of suitable reactors are stirred tanks, stirred tank cascades, loop reactors or Taylor reactors.

Taylor reactors, which serve to convert substances under the conditions of Taylor vortex flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is, accompanied by a series of different flow patterns which are characterized by a dimensionless parameter, known as the Taylor number Ta. As well as the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d \, v^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The viscosity force acts counter to the centrifugal force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage here are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor vortex flow are met over substantially the entire reactor length in the reactor volume, i.e., in such a way that the annular gap broadens in the direction of flow traversal.

The proportion of the constituent (A) in the subject coating material may vary very widely and is guided in particular by the intended flexibility of the subject sol-gel coating produced therefrom. There is an upper limit on the proportion; thus, it may not be chosen so high that phase separation occurs in the subject coating material, or the hardness and mar resistance of the sol-gel coating decrease too sharply. The skilled worker is therefore able to determine the proportion which is optimal in each case, on the basis of his or her knowledge in the art, with or without the assistance of simple preliminary tests.

The further essential constituent of the subject coating material is the sol (B), which is prepared by hydrolyzing, condensing, and completing the starting compounds (B1), (B2) and (B3) described hereinbelow. The sol (B) is preferably free of aromatics in the aforementioned sense.

The starting compound (B1) comprises at least one hydrolyzable metal compound of the general formula I $$MR_n \quad (I)$$

where the R radicals can be identical or different and are selected from hydrolyzable groups, hydroxyl groups and nonhydrolyzable groups.

In the general formula I, the variable M is aluminum, titanium or zirconium, but especially aluminum. Accordingly, the index n is 3 or 4.

The nonhydrolyzable groups R in the general formula I are preferably selected from alkyl groups, especially of 1 to 4 carbon atoms, for example methyl, ethyl, propyl and butyl groups; alkenyl groups, especially of 2 to 4 carbon atoms, for example vinyl, 1-propenyl, 2-propenyl and butenyl groups; alkynyl groups, especially of 2 to 4 carbon atoms such as acetylenyl and propargyl groups; and aryl groups, especially of 6 to 10 carbon atoms, for example phenyl and naphthyl a groups. Nonhydrolyzable groups R used are preferably alkyl groups.

The nonhydrolyzable groups R may contain at least one functional group. These functional groups may be for example epoxide groups, amino groups, olefinically unsaturated groups such as vinyl or (meth)acryloyl groups, mercapto groups, isocyanate groups and/or their reaction products with further reactive compounds.

Examples of hydrolyzable groups R in the aforementioned formula I are hydrogen atoms; alkoxy groups, especially of 1 to 20 carbon atoms, for example methoxy, ethoxy, n-propoxy, i-propoxy, n-butoxy, tert-butoxy and sec-butoxy groups; alkoxy-substituted alkoxy groups, or example beta-methoxyethoxy groups; acyloxy groups, especially of 1 to 4 carbon atoms, for example acetoxy and propionyloxy groups; and alkylcarbonyl groups such as for example acetyl groups.

Particularly preferred hydrolyzable groups R are those which bear no substituents and lead to aromatics-free hydrolysis products having a low molecular weight, for example lower alcohols, such as methanol, ethanol, propanol, n-butanol, i-butanol, sec-butanol and tert-butanol.

According to the invention, it is of advantage here for at least two, especially three hydrolyzable groups to be present in the case of aluminum and three, especially four, in the case of titanium or zirconium.

According to the invention, the above-described alkoxy groups are particularly advantageous and are therefore preferentially used. Very particular preference is given to using sec-butyloxy groups. An example of a very particularly preferred hydrolyzable metal compound (B1) used is, accordingly, aluminum tri-sec-butoxide.

The starting compound (B2) comprises at least one hydrolyzable silane of the general formula II

$$Si(R^1)_2(R^2)_2 \qquad (II).$$

In the general formula II, the variable $R^1$ is alkyl and/or cycloalkyl radicals, and the variable $R^2$, independently therefrom, is alkoxy and/or cycloalkoxy radicals.

Examples of suitable radicals $R^1$ are methyl, ethyl, propyl, isopropyl, n-butyl, sec-butyl, tert-butyl, pentyl, hexyl, cyclopropyl, cyclobutyl, cyclopentyl and/or cyclohexyl radicals, especially methyl, ethyl and/or propyl radicals.

Examples of suitable radicals $R^2$ are methoxy, ethoxy, propoxy, isopropoxy, n-butoxy, sec-butoxy, tert-butoxy, pentyloxy, hexyloxy, cyclopropyloxy, cyclobutyloxy, cyclopentyloxy and/or cyclohexyloxy radicals, especially methoxy, ethoxy and/or propoxy radicals.

Examples of silanes (B2) particularly useful for the purposes of the invention are therefore dimethyl-, diethyl-, dipropyl-, methylethyl-, methylpropyl- and ethylpropyldimethoxysilane, dimethyl-, diethyl-, dipropyl-, methylethyl-, methylpropyl- and ethylpropyldiethoxysilane, dimethyl-, diethyl-, dipropyl-, methylethyl-, methylpropyl- and ethylpropyldipropoxysilane, dimethyl-, diethyl-, dipropyl-, methylethyl-, methylpropyl- and ethylpropylmethoxyethoxysilane, dimethyl-, diethyl-, dipropyl-, methylethyl-, methylpropyl- and ethylpropylmethoxypropoxysilane, and dimethyl-, diethyl-, dipropyl-, methylethyl-, methylpropyl- and ethylpropylethoxypropoxysilane, of which dimethyldimethoxysilane and dimethyldiethoxysilane, especially dimethyldiethoxysilane, are particularly useful.

The starting compound (B3) comprises hydrolyzable silane of the general formula I.

$$SiR_4 \qquad (III),$$

In the general formula III, the variable R has the same meaning as indicated above for the general formula I.

At least one group R of the formula I must be a hydrolyzable group. Silanes (B3) having two, preferably four, and in particular three hydrolyzable groups R are particularly preferred.

For the sol (B) for use in accordance with the invention it is essential that the silane (B3) does not comprise a silane (B2) according to the general formula II.

Examples of highly suitable silanes (B3) are methyltriethoxysilane, methyltrimethoxysilane, 3-glycidyloxypropyltrimethoxysilane (GLYMO), or glycidyloxypropyltriethoxysilane (GLYEO), especially methyltriethoxysilane and GLYMO.

The weight ratios and the molar ratios (B1) (B2) (B3) of the starting materials may vary very widely, which is another particular advantage of the sol (B) for use in accordance with the invention.

Thus, for example, the molar ratio of silane (B2) to silane (B3) may vary very widely. It is of advantage in accordance with the invention if the molar ratio (B2) (B3) is 1:10 to 1:1 and in particular 1:6 to 1:2.

The atomic ratio of metal M to silicon can likewise in the sol (B) vary within very wide limits and depends in particular on the target mar resistance of the subject sol-gel coatings. Generally, replacing a portion of the silicon with aluminum in particular will enhance the mar resistance and the hardness of the subject sol-gel coatings. More particularly, the molar ratio M: Si is 1:10 to 1:1.5, preferably 1:6 to 1:3.

The above-described silanes (B2) and (B3) and metal compounds (B1) are hydrolyzed and condensed according to the invention in the presence of at least one organic, preferably nonaromatic, compound capable of forming chelate ligands. Concerned are organic compounds having at least two functional groups capable of coordinating onto metal atoms or ions. These functional groups are customarily electron donors which offer up electrons to metal atoms or ions as electron acceptors. According to the invention, in principle all organic compounds of the type mentioned are suitable, provided they do not adversely affect or even completely prevent the hydrolysis and condensation and/or the crosslinking to the ready produced sol-gel coating. Examples of suitable organic compounds are dimethyl glyoxime or compounds containing carbonyl groups in the 1,3 position, such as acetylacetone or ethyl acetoacetate. For details refer to Römpp Chemie Lexikon, Georg Thieme Verlag, Stuttgart, 1989, volume 1, page 634.

From a methodical point of view, the hydrolysis, condensation and complexation display no special properties but are effected under the conditions as generally used in sol-gel processes, such as, for example, the production described hereinbelow of the stock coating material (C). It is also of advantage, for the sol to be used (C) in accordance with the invention if somewhat lower temperatures are employed.

For this, preferably, the silanes (B2) and (B3), the metal compounds (B1) and the organic compounds capable of forming chelates are initially charged, whereupon the mixture is admixed, preferably at relatively low temperatures, especially 0° C., with water and at least one of the hereinbelow-described condensation catalysts during the preparation of the stock coating material (C), especially hydrochloric acid and/or acetic acid.

With particular preference, the silanes (B2) and a fraction of the silanes (B3), and also the metal compounds (B1) are introduced as initial charge, after which the organic compounds capable of forming chelates, the remainder of the silanes (B3), water, and at least one of the hereinbelow-described condensation catalysts, especially hydrochloric acid and/or acetic acid, are metered successively into the mixture, preferably at relatively low temperatures, in particular from 0 to 40° C.

The reaction can be carried out in the presence of the hereinbelow-described solvents during the preparation of the stock coating material (C) and/or nanoparticles. According to the invention, however, it is of advantage for the reaction to be carried out in the absence of these components. Since the resulting sol (B) is very reactive, it is advisable to keep it at temperatures below 0° C. until it is to be put to further use.

The solids content of the sol (B) may vary very widely. Advantageously it is from 50 to 60%, preferably 10 to 50% and especially 20 to 40% by weight, in each case based on the total amount of sol (B).

The fraction of the subject coating material which is attributable to the sol (B) can likewise vary within very wide limits and depends in particular on how the performance profile with regard to mar resistance and hardness on the one hand and flexibility on the other is to be balanced out for the subject sol-gel coatings produced therefrom. This fraction too has an upper limit; it must not be so high as to cause phase separation in the subject coating material and/or excessive hardness and brittleness for the subject sol-gel coatings produced therewith. The skilled worker is therefore able to determine the best fraction in each case on the basis of his or her expertise with or without the assistance of simple preliminary tests.

Particularly advantageous subject coating materials contain, in each case based on their total amount, 1 to 30, preferably 2 to 20 and especially 3 to 15% by weight of the acrylate copolymer solution (A) and 5 to 50, preferably 10 to 40 and especially 15 to 30% by weight of the sol (B) and also up to 94% by weight of at least one suitable additional constituent.

Examples of suitable additional constituents are so-called stock coating materials (C). They too are preferably free from aromatic solvents.

They are prepared by controlled hydrolysis and condensation of at least one of the above-described organically modified hydrolyzable silanes (B3) or at least one of the above-described organically modified hydrolyzable silanes (B2), or mixtures thereof. In accordance with the invention it is of advantage to use at least two silanes (B3).

The silanes (B3) and/or (B2) can be used in whole or in part in the form of precondensates, i.e., compounds formed by partial hydrolysis of the silanes (B3) and/or (B2), either alone or mixed with other hydrolyzable compounds.

The hydrolysis and condensation may optionally be carried out in the presence of organic monomers, of solvents, preferably aromatics-free solvents, of the above-described organically modified hydrolyzable metal alkoxides (B1) and of metal oxides in the form of nanoparticles. These nanoparticles are <50 nm. They can be for example $Al_2O_3$, $ZrO_2$ and/or $TiO_2$.

To hydrolyze and condense the silanes (B3) and/or (B2) they are precondensed in the desired proportion with water. The water is added at a rate such that local excess concentrations are avoided. This is accomplished for example by introducing the water into the reaction mixture using moisture-laden adsorbents, for example silica gel or molecular sieves, hydrous organic solvents, for example 80% ethanol, or salt hydrates, for example $CaCl_2 \times 6H_2O$. The precondensation is preferably effected in the presence of a hydrolysis and condensation catalyst but in the absence of an organic solvent.

In a further variant, the hydrolysis and condensation of the hydrolyzable silanes (B3) and/or (B2) is carried out in the presence of an aromatics-free organic solvent, such as an aliphatic alcohol, such as methanol, ethanol, propanol, isopropanol or butanol, an ether such as dimethoxyethane, an ester such as dimethyl glycol acetate or methoxypropyl acetate and/or 2-ethoxyethanol or a ketone such as acetone or methyl ethyl ketone.

Useful hydrolysis and condensation catalysts include proton- or hydroxyl-ion-detaching compounds and amines. Specific examples are organic or inorganic acids, such as hydrochloric acid, sulfuric acid, phosphoric acid, formic acid or acetic acid, and organic or inorganic bases such as ammonia, alkali metal hydroxides or alkaline earth metal hydroxides, e.g., sodium, potassium or calcium hydroxide, and amines soluble in the reaction medium, examples being lower alkylamines or alkanolamines. Particular preference is given in this context to volatile acids and bases, especially hydrochloric acid, acetic acid, ammonia or triethylamine.

The precondensation is conducted at temperatures from 0 to 100° C. and preferably 20 to 95° C., The mixture of the starting materials is advantageously first heated to temperatures of 40 to 80° C., especially 50 to 70° C., and held at these temperatures for a certain time, in particular 0.5 to 10 hours, after which it is heated to temperatures of 80 to 100° C., especially 85 to 95° C. Thereafter, some of the resulting reaction mixture may be distilled off azeotropically.

The precondensation is not carried on beyond the point at which the resulting stock coating material (B) loses its liquid consistency.

Used thus far, the fraction of the stock coating material (C) which is attributable to the subject coating material can vary within very wide limits. It therefore offers an additional advantageous variation possibility for the quality profile of the subject coating material.,Its fraction depends in particular on the target, mar resistance and hardness for the subject sol-gel coating produced therefrom. The fraction has an upper limit; it must not be so high as to cause phase separation in the subject coating material and/or excessive hardness and brittleness for the subject sol-gel coatings produced therewith. Thus in general 40% by weight of stock coating material (C), based on the total amount of the coating material, should not be exceeded. The skilled worker is therefore able to determine the best fraction in each case on the basis of his or her expertise with or without the assistance of simple preliminary tests.

A further example of a suitable additional constituent is the "additive solution" (D). It is preferably aromatics-free.

The additive solution (D) contains at least one ethylenically unsaturated compound (d1) which has at least one epoxide group. An example of a suitable compound (d1) is glycidyl (meth)acrylate.

It further contains as component (d2) at least one silane (B3) having at least one nonhydrolyzable group R which contains at least one epoxide group. An example of a suitable compound (d2) is 3-glycidyloxypropyltrimethoxysilane (GLYMO).

Not least, it contains at least one adduct (d3) of at least one silane (B3) with at least one nonhydrolyzable group R which has at least one amino group and with at least one cyclic ethylenically unsaturated dicarboxylic anhydride. An example of a suitable silane. (B1) is 3-aminopropyltriethoxysilane. Examples of suitable dicarboxylic anhydrides are maleic anhydride and itaconic anhydride.

The additive solution contains the components (d1), (d2) and (d3) in a weight ratio of (1 to 10): (1 to 30) 1, especially (2 to 6) (10 to 20) 1. The solids content of the additive solution (D) is preferably below 80% by weight, preferably below 60% by weight and especially below 50% by weight.

The fraction of the subject coating material which is attributable to the additive solution (D) can vary within wide limits, if the additive solution (D) is used. The skilled worker can determine whichever is the best fraction on the basis of his or her expertise with or without the assistance of simple preliminary tests.

Further examples of suitable additional constituents are solvents (E), preferably aromatics-free solvents (E). In the subject coating material, they are then especially contained when particularly thin; subject sol-gel coatings, preferably having a dry film thickness <5 μm, are to be produced. In this case, the amount of suitable solvent (E) in the subject coating material, in each case based on the coating material, can be up to 94%, preferably up to 90%, especially preferably up to 80% and particularly up to 70% by weight. Examples of suitable solvents (E) are the abovementioned lower alcohols, especially ethanol, or glycol ethers such as ethyl glycol or butyl glycol of which ethanol is most especially preferably used.

Further examples of suitable additional constituents are customary and known coating additives (F). All coating additives (F) are well suitable which do not adversely affect, but advantageously vary and improve, the properties profile of the subject sol-gel coatings, especially their optical properties (appearance) and mar resistance.

Examples of particularly suitable coating additives (F) are
UV absorbers;
free radical scavengers;
catalysts for crosslinking;
slip additives;
polymerization inhibitors;
defoamers;
antipopping agents, in regard of which the controlled use of minor amounts of aromatic solvents may be of benefit;
emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfonic acids of alkoxylated alkanols, polyols, phenols and alkylphenols;
wetting agents such as siloxanes, fluorous compounds, carboxylic monoesters, phosphoric esters, polyacrylic acids and their copolymers or polyurethanes;
adhesion promoters;
flow control agents;
film-forming auxiliaries such as cellulose derivatives;
flame retardants or
rheology control additives such as those known from the patent documents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils; or synthetic polymers having ionic and/or associative groups such as polyvinyl alcohol, poly(meth) acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates.

Further examples of suitable additives (F) are described in the textbook "Lackadditive [Additives for coatings]" by Johan Bieleman, Wiley-VCH, Weinheim, N.Y., 1998.

The subject coating material has a solids content of up to 80, preferably up to 60, particularly preferably up to 40 and especially up to 20% by weight. When particularly thin subject sol-gel coatings, i.e., coatings <5 µm in thickness, are to be produced, it is advisable to select a solids content of less than 20% by weight. In this case, solids contents of 5 to 15% and in particular 7 to 12% by weight are most especially preferably employed.

The production of the subject coating material has no particular features but is effected in a conventional and known manner by mixing of its essential constituents (A) and (B) and also optionally of at least one suitable additional constituent (C), (D), (E) and/or (F) in customary and known mixing assemblies such as dissolvers. The constituents can be mixed with each other in any desired manner. For example, they can be introduced into the mixing assembly all at once and mutually mixed. Or else the sol (B) is initially charged and then the remaining constituents are added one by one in succession. It is advantageous in this process to add the stock coating material (B)—used thus far—before the acrylate copolymer solution (A). When a solvent (E) is used, it is advantageously added after the addition of the stock coating material (B)—used thus far—and before the addition of the constituent (A) and optionally (D). When coating additives (F) are used, they are advantageously added after the addition of the stock coating material (B)—used thus far—and before the addition of the constituent (A). When solvents (E) and coating additives (F) are used, the coating additives (F) are preferably added before the addition of the solvents (E).

The subject coating materials are outstandingly suitable for producing the subject sol-gel coatings, especially sol-gel clearcoats.

According to the invention, any conceivable substrate can be coated therewith. By way of example, mention may be made of-substrates of metal, plastic, glass, wood or ceramic. These substrates may have been primed. In the case of plastic, the priming may take the form of hydropriming. In the case of metal, the substrate may also have been subjected to a surface treatment such as galvanizing or phosphating or anodizing for example. Furthermore, the metal substrate may already support an electrocoat and a surfacer as priming.

The application of the subject coating materials has no special process features, and the customary application methods such as spraying, knife coating, brushing, flow coating, impregnating, dipping, trickling or rolling can be used. The substrates and the application equipment may be moving or at rest.

After application, the subject coating materials are cured to form the subject sol-gel coatings. Curing may be preceded by a predrying step. Again, the customary and known processes and apparatuses such as forced air ovens can be used. According to the invention, however, it is of advantage to cure the subject coating materials with intermediate IR radiation. This makes it possible to specifically coat and make mar resistant only parts of substrates or single-coat or multicoat paint systems at damaged or at particularly vulnerable points without the other parts being exposed to thermal stress. This enables the subject coating materials to be used in automotive refinish. Since here, moreover, the amount of the subject coating material can be restricted to a minimum, its use is also particularly economical.

The subject coating materials can be applied directly to the substrates in order that a mar resistant subject sol-gel coating be formed thereon after curing. In this way it is possible to obtain mar resistant finishes on substrates as are customary for the manufacture of vehicles, of other structural parts and equipment, such as radiators, coils or containers, or of furniture.

However, the particular advantages of the subject coating materials become particularly evident when they are used for coating single-coat or multicoat paint systems with the subject sol-gel coatings. It proves to be a particular advantage here that the single-coat or multicoat paint systems may have been completely cured.

Accordingly, the subject coating materials are useful for coating single-coat or multicoat paint systems of the type customary and known in the fields of automotive original equipment manufacturing coatings, automotive repair coatings, industrial coatings, including coil and container coatings, plastics coatings and furniture coatings.

Examples of single-coat paint systems of this kind are the solid-color topcoats known in automotive OEM finishing, which contain binders, crosslinkers and effect- and/or color-conferring pigments.

Examples of multicoat paint systems are those which contain an effect- and/or color-conferring basecoat, especially a waterborne basecoat, and a clearcoat and are generated in the realm of automotive OEM coating by the wet on wet technique as described for example in the patent documents U.S. Pat. No. 3,639,147, DE-A-33 33 072, DE-A-38 14 853, GB-A-2 012 191, U.S. Pat. No. 3,953,644, EP-A-0 260 447, DE-A-39 03 804, EP-A-0 320 552, DE-A-36 28 124, U.S. Pat. No. 4,719,132, EP-A-0 297 576, EP-A-0 069 936, EP-A-0 089 497, EP-A-0 195 931, EP-A-0 228 003, EP-A-0 038 127 and DE-A-28 18 100, or in the realm of automotive refinish. The subject coating materials are particularly useful for coating multicoat paint systems of this kind in particular.

Examples of suitable waterborne basecoats and of the corresponding multicoat paint systems are known from the patent documents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747 or EP-A-0 401 565.

Examples of suitable one component (1K), two component (2K) or multicomponent (3K, 4K) clearcoat materials are known for example from the patent documents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

One component (1K) clearcoat materials, as will be known, contain hydroxyl-containing binders and crosslinkers such as blocked polyisocyanates, tris(alkoxycarbonylamino)triazines and/or aminoplast resins. In a further variant, they contain polymers having pendant carbamate and/or allophanate groups as binders and optionally carbamate- and/or allophanate-modified aminoplast resins as crosslinkers.

Two component (2K) or multicomponent (3K, 4K) clearcoat materials, as will be known, contain hydroxyl-containing binders and polyisocyanate crosslinkers as essential constituents, which are kept separated before use.

Examples of suitable powder clearcoat materials are known for example from the German patent document DE-A-42 22 194 or BASF Lacke+Farben AG's 1990 Pulverlacke product information bulletin.

Powder clearcoat materials, as will be known, contain epoxy-functional binders and polycarboxylic acid crosslinkers as essential constituents.

Examples of suitable powder slurry clearcoat materials are known for example from the US patent U.S. Pat. No. 4,268,542 and the German patent applications DE-A-195 18 392.4 and DE-A-196 13 547 or are described in the German patent application DE-A-198 14 471.7, which was unpublished at the priority date of the present invention.

Powder slurry clearcoat materials, as will be known, contain powder clearcoat materials dispersed in an aqueous medium.

UV curable clearcoat materials are disclosed for example in the patent documents. EP-A-0,540 884, EP-A-0 568 967 or U.S. Pat. No. 4,675,234.

As will be known, they contain actinically and/or electron beam curable low molecular weight, oligomeric and/or polymeric compounds, preferably radiation curable binders, especially on the basis of ethylenically unsaturated prepolymers and/or ethylenically unsaturated oligomers, optionally one or more reactive diluents and also optionally one or more photoinitiators. Examples of suitable radiation curable binders are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates and the corresponding methacrylates. Preference is given to using binders which are free of aromatic structural units.

However, it is also possible to employ multicoat clearcoat systems such as for example a clearcoat system based on hydroxyl-containing binders and blocked polyisocyanates and aminoresins as crosslinkers, which is situated directly atop the waterborne basecoat and on top of which there is a further clearcoat based on carbamate and/or allophanate group containing binders and aminoresins as crosslinkers.

In the subject process, the single-coat or multicoat paint systems, especially the clearcoats, are cured prior to application of the subject coating material. This constitutes a further particular advantage of the subject coating material and of the process, since the coating processes and apparatuses customarily used in commercial practice do not have to be modified; all that is needed is that a customary known process is followed by a further coating step which is essentially independent thereof.

It proves to be a further particular advantage that substantially all customarily used clearcoat systems can be coated with the subject coating material.

The subject sol-gel coatings which are produced from the subject coating materials, preferably by the subject process, are notable for excellent mar resistance coupled with very good adhesion, even after exposure to condensation. Similarly, the appearance is very good. The subject process is therefore particularly useful for the coating of vehicle bodies, especially automobile bodies, with multicoat systems; for industrial coating, including container coatings, for plastics coating and for furniture coating.

EXAMPLES

Preparation Example 1

Preparation of an Acrylate Copolymer for Modifying the Sol-gel Clearcoat Material 39 parts of ethoxyethyl propionate were charged to a suitable stirred vessel equipped with reflux condenser and stirrer and were heated to 130° C. A first monomer feed vessel was used to premix 9.598 parts of butyl methacrylate, 7.708 parts of methyl methacrylate, 8.003 parts of styrene, 4.253 parts of Methacrylester 13.0 (methacrylic ester having a long alkyl radical in the ester moiety) and 9.096 parts of hydroxyethyl acrylate. A second monomer feed vessel was charged with 3.810 parts of hydroxyethyl acrylate, 1.831 parts of acrylic acid and 0.916 part of ethoxyethyl propionate. An initiator feed vessel was charged with 3.692 parts of TBPEH (tert-butyl perethylhexanoate)peroxide and 6.025 parts of ethoxyethyl propionate. The contents of the first monomer feed vessel were metered into the reactor at a uniform rate over four hours. After two hours and 30 minutes after the start of the first monomer feed, the second monomer feed was started. To this end, the contents of the second monomer feed vessel were metered into the reactor at a uniform rate over one hour and 30 minutes. The contents of the initiator feed vessel were metered into the reactor at a uniform rate over four hours and 30 minutes, the initiator feed being started five minutes before the first monomer feed. After the additions, the resulting reaction mixture was polymerized at 130° C. for two hours until an original viscosity of 2.2 dPas, a solids content of 50% by weight (15 minutes/180° C.) and an acid number of 30 mg KOH/g had been obtained. Thereafter, the ethoxyethyl propionate was distilled off at 100° C. under reduced pressure until a solids content of 81% by weight was reached. The resulting reaction mixture was cooled to 80° C. and adjusted to a solids content of 75% by weight with butyl glycol and ethoxyethyl propionate (weight ratio 5:1).

To prepare the subject sol-gel clearcoat material, the solution of the acrylate copolymer was adjusted to a solids content of 20% by weight with butyl glycol to obtain the solution for organic modification.

Preparation Example 2

Preparation of the Sol 1 to be Used According to the Invention

A mixture of 49.8 parts of aluminum tri-sec-butoxide, 71.2 parts of methyltriethoxysilane and 29.6 parts of dimethyldiethoxysilane was charged to a suitable reaction vessel at 25° C. 19.6 parts of ethyl acetoacetate were metered into the mixture at a rate such that its temperature did not exceed 25° C. After addition, the temperature of the reaction mixture was raised to 40° C. and held at this temperature for 30 minutes. The batch was then cooled to 25° C., after which 44 parts of glycidyloxypropyltrimethoxysilane (GLYMO) were metered in. Thereafter, the reaction mixture was cooled to 0° C. At this temperature, 52.2 parts of 0.1 N hydrochloric acid were metered into the initial charge over 2.5 hours. Following the addition, the resulting reaction mixture was aged at room temperature for 24 hours. The experimentally determined solids content was 34.9% by weight (15 minutes/180° C.). The viscosity (original; determined using a plate/cone viscometer) was 5 mpas at a shear gradient D=103 $s^{-1}$. The pH was at 3.9. The sol was kept at −18° C. until used for preparing the subject sol-gel clearcoat material.

Preparation Example 3

Preparation of the Sol 2 to be Used According to the Invention

A mixture of 49.8 parts of aluminum tri-sec-butoxide, 89 parts of methyltriethoxysilane and 14.8 parts of dimethyldiethoxysilane was charged to a suitable reaction vessel at 25° C. 19.6 parts of ethyl acetoacetate were metered into the mixture at a rate such that its temperature did not exceed 25° C. After addition, the temperature of the reaction mixture was raised to 40° C. and held at this temperature for 30 minutes. The batch was then cooled to 25° C., after which 44 parts of glycidyloxypropyltrimethoxysilane (GLYMO) were metered in. Thereafter, the reaction mixture was cooled to 0° C. At this temperature, 52.2 parts of 0.1 N hydrochloric acid were metered into the initial charge over 2.5 hours. Following the addition, the resulting reaction mixture was aged at room temperature for 24 hours. The experimentally determined solids content was 34.3% by weight (15 minutes/180° C.). The viscosity (original; determined using a plate/cone viscometer) was 5 mPas at a shear gradient D=103 $s^{-1}$. The pH was at 3.8. The sol was kept at −18° C. until used for preparing the subject sol-gel clearcoat material.

Example 1

Preparation of the Subject Sol-gel Clearcoat Material 1

The sol-gel clearcoat material 1 was obtained by initially charging 58.6 parts of the sol 1 according to Preparation Example 2 and adding to it in succession 0.4 parts of BYK® 301 (commercial leveling agent of the company Byk Chemie), 150 parts of ethanol, 20 parts of the solution for organic modification according to Preparation Example 1, 0.43 parts of Tinuvin® 400 and 0.29 parts of Tinuvin® 123 (both commercial light stabilizers, from the company Ciba Specialty Chemicals, Inc.) with stirring and mixing the constituents. The result was the subject sol-gel clearcoat material 1 having a solids content of 10.6% by weight.

Example 2

Preparation of the Subject Sol-gel Clearcoat Material 2

Example 1 was repeated but using 59.8 parts of the sol 2 from Preparation Example 3 instead of the sol 1 from Preparation Example 2. This gave the subject sol-gel clearcoat material 2, having a solids content of 10.6% by weight.

Example 3

Preparation of the Subject Sol-gel Clearcoat Material 3

Example 1 was repeated but using 30 parts of the solution for organic modification from Preparation Example 1 instead of 20 parts. This gave the subject sol-gel clearcoat material 3, having a solids content of 11% by weight.

Examples 4 to 6

Preparation of the Subject Sol-gel Coatings 1 to 3 on a Multicoat Paint System

1. Preparation of the Test Panels of Examples 4 to 6

For Example 4, the subject sol-gel clearcoat material 1 from Example 1 was used to produce the subject sol-gel coating 1.

For Example 5, the subject sol-gel clearcoat material 2 from Example 2 was used to produce the subject sol-gel coating 2.

For Example 6, the subject sol-gel clearcoat material 3 from Example 3 was used to produce the subject sol-gel coating 3.

The test panels of Examples 4 to 6 with the subject sol-gel coatings 1 to 3 were prepared in accordance with the following general instructions:

A commercially available surfacer from BASF Coatings AG was applied with a cup gun to steel panels cathodically coated to a depth of 18–22 $\mu$m with a commercially available electrocoat material and baked. The result was a surfacer coat 35 to 40 $\mu$m in thickness. A commercially available black solid-color basecoat material from BASF Coatings AG was then applied atop the surfacer in the same way and predried at 80° C. for 10 min. After cooling the panels, a coast of a commercially available two component (2K) clearcoat material (FF98-0015 from BASF Coatings AG) was applied and predried at 50° C. for 10 min and then crosslinked at 140° C. together with the basecoat for 45 min. The result was a basecoat 15 $\mu$m in thickness and a clearcoat 44 $\mu$m in thickness. The black solid-color basecoat material was chosen because any marring is most easily detectable on the corresponding test panels.

After cooling, the subject sol-gel clearcoat materials 1 to 3 of the Examples 1 to 3 were applied, so that the subject sol-gel coatings 1 to 3 were obtained in a thickness of 4.5 $\mu$m respectively after curing with intermediate IR radiation (distance of radiator from surface 18 cm; radiator: Modul Infrarotstrahler MMS 2000 from Haraeus; duration: 5 min; temperature: 140° C., measured with a heat sensor on the reverse of the test panels).

2. Testing of the Properties of the Subject Sol-gel Coatings 1 to 3

For testing the technical properties of the subject sol-gel coatings 1 to 3, the above-described test panels are used.

2.1 Adhesion of the Sol-gel Coatings 1 to 3

Table 1 gives an overview of the cross-hatch tests and of the results obtained.

TABLE 1

Adhesion of subject sol-gel coating

| Test methods | Examples | | |
|---|---|---|---|
| | 4 | 5 | 6 |
| Cross-hatch to DIN 53151 (2 mm) [rated from 0 to 5] | 0 | 0 | 0 |
| Cross-hatch after 240 hours of loading with CCC and regeneration for | 0 | 0 | 0 |
| 1 hour | 0 | 0 | 0 |
| 3 hours | 0 | 0 | 0 |
| 6 hours | 0 | 0 | 0 |
| 24 hours | 0 | 0 | 0 |

[rated from 0 to 5]: 0 = best value; 5 = worst value
CCC = constant condensation conditions to DIN 50017

Although the clearcoat had been completely baked prior to its overcoating with the sol-gel clearcoat materials 1 to 3, there was no delamination of the sol-gel coatings 1 to 3.

2.2 Mar Resistance of the Sol-gel Coatings 1 to 3 by the Brush Test

Before this test was carried out, the test panels were stored at room temperature for 2 weeks following application of the coatings.

The mar resistance of the sol-gel coating on the test panels was assessed with the aid of the BASF brush test described in FIG. 2 on page 28 of the article by P. Betz and A. Bartelt, Progress in Organic Coatings, 22 (1993), pages 27–37, albeit with modification with regard to the weight used (2 000 g instead of the 280 g mentioned therein), assessment taking place as follows:

In the test, the surface of the paintwork was damaged with a mesh fabric loaded with a mass. The mesh fabric and the paintwork surface were copiously wetted with a laundry detergent solution. The test panel was moved to and fro underneath the mesh fabric in reciprocal movements by means of a motor drive.

The test element was an eraser (4.5×2.0 cm, broad side perpendicular to the direction of marring) covered with nylon mesh fabric (No. 11, 31 $\mu$m mesh size, Tg 50° C.). The applied weight was 2 000 g.

Prior to each test, the mesh fabric was renewed, with the running direction of the fabric meshes parallel to the direction of marring. Using a pipette, about 1 ml of a freshly stirred 0.25% strength Persil solution was applied in front of the eraser. The rotary speed of the motor was adjusted so that 80 double strokes were performed within a period of 80 s. After the test, the remaining wash liquor was rinsed off with cold tap water and the test panel was blown dry with compressed air.

It was found that the subject sol-gel coatings 1 to 3 were completely free of any marring.

2.4 Mar Resistance With Respect to Steel Wool

The sol-gel coatings 1 to 3 were exposed to 10 double strokes with steel wool under an applied weight of 800 g.

The mar resistance was assessed visually on the basis of the damage occurring, and was scored (ratings 1 to 6: 1=very good; 2 good; 3=satisfactory; 4=adequate; 5=deficient; 6=inadequate).

The sol-gel coatings 1 and 2 both scored rating 1.
The sol-gel coating 3 scored the rating 1 to 2.
This again demonstrates the extremely high mar resistance of the subject sol-gel coatings.

2.5 Lubricity (Slip) of the Subject Sol-gel Coatings 1 to 3

The surface slip was measured using the MOD 9505AE—SERIAL 7035-0689-2 slip meter from ALTEK, P.O. Box 1128, Torrington, Conn. 06790, USA. In this measurement, a weight provided with three hemispheres was pulled with a constant force over the surface of the test panels. The frictional resistance which occurred when, this was done was plotted graphically as a dimensionless variable using an x/y plotter. The height of the resultant peak is a relative measure of the lubricity of the surface in question: the lower the height, the more lubricious the surface.

In this test, the sol-gel coating 1 had a relative peak height of 0.045, the sol-gel coating 2 had one of 0.113 and the sol-gel coating 3 had one of 0.037. For comparison, the commercial two component (2K) clearcoat material (FF98-0015 from BASF Coatings AG) used to produce the multicoat system had a relative peak height of 0.05. Thus the lubricity of the subject sol-gel coatings corresponded to those of commercial clearcoat materials and even exceeded these.

2.6 Chemical Resistance by the MB Gradient Oven Test

In the MB gradient oven test, well known to those skilled in the art, the test panels of the Examples 4 to 6 were exposed under defined conditions to damage by sulfuric acid, water, pancreatin and tree resin. For this purpose, the test substances were applied at a distance of one segment width in each case (adjustment of the gradient to 30–75° C. [1° C. per heating segment]). Following storage under standard conditions of 23° C. for 72 hours, the test panels were exposed for 30 min in a gradient oven (e.g., type 2615 from BYK-Gardner). The temperature at which the first visible change occurred was found.

The experimental results are reported in Table 2.

TABLE 2

Chemical resistance by the MB gradient ovent test

| | 1st marking at ° C.: Examples | | |
|---|---|---|---|
| Test substance | 4 | 5 | 6 |
| Sulfuric acid 1% | 40 | 45 | 43 |
| Water distilled | >75 | >75 | >75 |
| Pancreatin | 53 | 52 | 45 |
| Tree resin | >75 | >75 | >75 |

The results of the MB gradient oven test substantiate the high chemical resistance of the subject sol-gel coatings 1 to 3.

2.7 Stonechip Test

AUDI AG's well-known stonechip test under multiple impact (2×500 gram/2 bar) yielded in all cases an index of 3 and a degree of rusting of 2. The subject sol-gel coatings 1 to 3 together with the multicoat paint systems accordingly proved to be sufficiently stable to stone chipping.

2.8 Erichsen Indentation

The Erichsen indentation to DIN EN ISO 1520: 1995-04 was 4 mm in Examples 4 and 5 and 3.6 mm in Example 6.

2.9 Appearance 2.9.1 Visual Evaluation

The overall optical impression of the test panels of Examples 4 to 5 was judged visually; in all cases it was very good.

2.9.2 Gloss and Haze

Gloss and haze of the test panels of Examples 4 to 6 were measured reflectometrically at an angle of 20° using a BYK reflectometer before and after loading with the constant condensation conditions (CCC) of DIN 50017. The results obtained are in Table 3.

TABLE 3

Gloss and haze of the multicoat paint systems of Examples 4 to 6 with the subject sol-gel coatings 1 to 3

| Examples No. | Gloss/Haze before loading | Gloss/Haze after CCC loading |
|---|---|---|
| 4 | 75/6 | 75/8 |
| 5 | 75/6 | 75/7 |
| 6 | 77/6 | 77/7 |

The subject sol-gel coatings were hence in accordance with commercial requirements in this respect as well.

What is claimed is:

1. A sol-gel coating material comprising (A) an acrylate copolymer solution comprising at least one acrylate copolymer (A1) prepared by copolymerizing at least the following monomers:
   a1) at least one (meth)acrylic ester which is substantially free of acid groups,
   a2) at least one ethylenically monomer which bears at least one hydroxyl group per molecule and is substantially free of acid groups, and
   a3) at least one ethylenically unsaturated monomer which bears per molecule at least one acid group which is convertible into the corresponding acid anion group;

(B) a sol prepared by hydrolyzing, condensing and complexing
   B1) at least one hydrolyzable metal compound of the general formula I $$MR_n \qquad (I)$$

where the variables and the index have the following meaning:
   M=aluminum, titanium or zirconium,
   R=hydrolyzable groups, hydroxyl groups, nonhydrolyzable groups, and mixtures thereof, with the proviso that there is at least one hydrolyzable group, and
   n=3 or 4;
   B2) at least one hydrolyzable of the general formula II $$Si(R^1)_2(R^2)_2 \qquad (II)$$

in which the variables $R^1$ and $R^2$ have the following meaning:
   $R^1$=alkyl radicals, cycloalkyl radicals, and mixtures thereof, and
   $R^2$=alkoxy radicals, cycloalkoxy radicals, and mixtures thereof; and B3) at least one hydrolyzable silane of the general formula III $$SiR_4 \qquad (III),$$

where the variable R has the meaning above;
   with the proviso that the silane (B3) is not a silane (B2) according to general formula II, and (C) 0 to 40% by weight based on the total amount of coating material, of a material prepared by hydrolyzing and condensing at least one hydrolyzable silane (B3) of the general formula III.

2. The sol-gel condition material of claim 1, characterized in that the radical $R^1$ is at least one group selected from methyl, ethyl, propyl, isopropyl, n-butyl sec-butyl, tert-butyl, pentyl, hexyl, cyclopropyl, cyclobutyl, cyclopentyl and/or cyclohexyl group and the radical $R^2$ is selected from the group consisting of methoxy, ethoxy, propoxy, isopropoxy, n-butoxy, sec-butoxy, tert-butoxy, pentyloxy, hexyloxy, cyclopropyloxy, cyclobutyloxy, cyclopentyloxy, cyclohexyloxy groups, and mixtures thereof.

3. The sol-gel coating material of claim 1, characterized in that the molar ratio of silane (B2) to silane (B3) is 1:10 to 1:1.

4. The sol-gel coating material of claim 3, characterized in that the molar ratio of silane (B2) to silane (B3) is 1:6 to 1:2.

5. The sol-gel coating material of claim 1, characterized in that the molar ratio of silane (B2) to silane (B3) is 1:10 to 1:1.5.

6. The sol-gel coating material of claim 5, characterized in that the atomic ratio of metal M to silicon is 1:6 to 1:2.

7. The sol-gel coating material of claim 1, characterized in that it is aromatics free.

8. The sol-gel coating material of claim 1, comprising, in each case based on its total amount, 1 to 30% by weight of the acrylate copolymer solution (A) and 5 to 50% by weight of the sol (B) and also up to 94% by weight of at least one suitable additional constituent.

9. The sol-gel coating material of claim 8, comprising, in each case based on its total amount, 2 to 20% by weight of the acrylate copolymer solution (A) and 10 to 40% by weight of the sol (B) and also up to 88% by weight of at least one suitable additional constituent.

10. The sol-gel coating material of claim 9, comprising, in each case based on its total amount, 3 to 15% by weight of the acrylate copolymer solution (A) and 15 to 30% by weight of the sol (B) and also up to 82% by weight of at least one suitable additional constituent.

11. The sol-gel coating material of claim 1, characterized in that, in the general formulae I and III,
   the nonhydrolyzable groups R are at least one group selected from alkyl groups of 1 to 4 carbon atoms; alkenyl groups of 2 to 4 carbon atoms; alkynyl groups of 2 to 4 carbon atoms; aryl groups of 6 to 10 carbon atoms; and mixtures thereof, and
   the hydrolyzable groups R are at least one group selected from hydrogen atoms, alkoxy groups of 1 to 20 carbon atoms; alkoxy-substituted alkoxy groups of 3 to 20 carbon atoms; acyloxy groups of 1 to 4 carbons atoms; alkylcarbonyl groups of 2 to 6 carbon atoms; and mixtures thereof.

12. The sol-gel coating material of claim 11, characterized in that
   the hydrolyzable groups R are at least one group selected from methoxy, ethoxy, n-propoxy, i-propoxy, n-butoxy, sec-butoxy, beta-methoxyethoxy, acetoxy, propionyloxy, acetyl groups and mixtures thereof, and the nonhydrolyzable groups R are at least one group selected from methyl, ethyl, propyl, butyl, vinyl, 1-propenyl, 2-propenyl, butenyl, acetylenyl, propargyl, phenyl, naphtyl groups, and mixtures thereof.

13. The sol-gel coating material of claim 1, characterized in that the nonhydrolyzable groups R contain at least one functional group.

14. The sol-gel coating material of claim 13, characterized in that the nonhydrolyzable groups R contain at least one functional group selected epoxide groups, amino groups, olefinically unsaturated groups, mercapto groups, isocyanate groups, and mixtures thereof.

15. The sol-gel coating material of claim 1, characterized in that complexing is effected using organic compounds which from chelate ligands.

16. The sol-gel coating material of claim 1, characterized in that it is a sol-gel clearcoat material.

17. A process for producing mar-resistant sol-gel coatings on single-coat or multicoat paint systems by
   (i) applying a paint system to a substrate,
   (ii) applying a sol-gel coating material atop the paint system, and
   (iii) curing th sol-gel coating material, characterized in that the applied sol-gel coating material is the sol-gel coating material of claim 1.

18. The process of claim 17, characterized in that the applied sol-gel coating material is cured by irradiation with intermediate IR radiation.

19. The process of claim 17 or 18, characterized in that the paint system has been completely cured.

20. The process of claim 17, characterized in that the paint system is selected from single coat paint systems and multicoat paint systems.

21. The process of claim 20, characterized in that the paint system is selected from automotive original equipment manufacturing coatings, automotive repair coatings, industrial coatings, plastics coatings and furniture coatings.

22. A sol-gel coating prepared from a sol-gel coating material as claimed in claim 1.

23. A substrate comprising at least one sol-gel coating as claimed in claim 22.

* * * * *